Feb. 14, 1928.
W. WIEGAND
1,658,958
SEED CORN BUTT AND TIPPER
Filed May 25, 1926
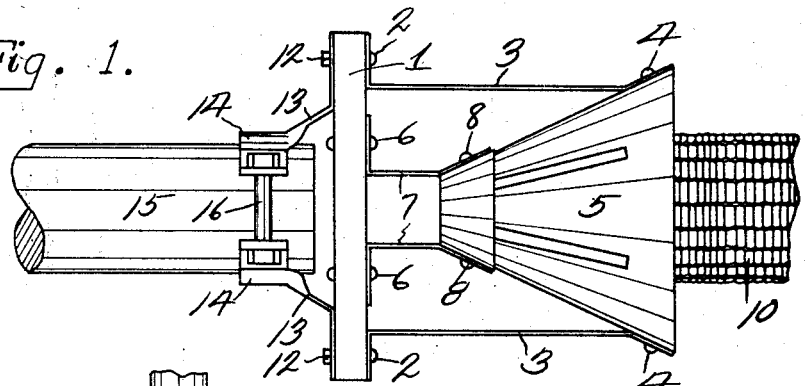
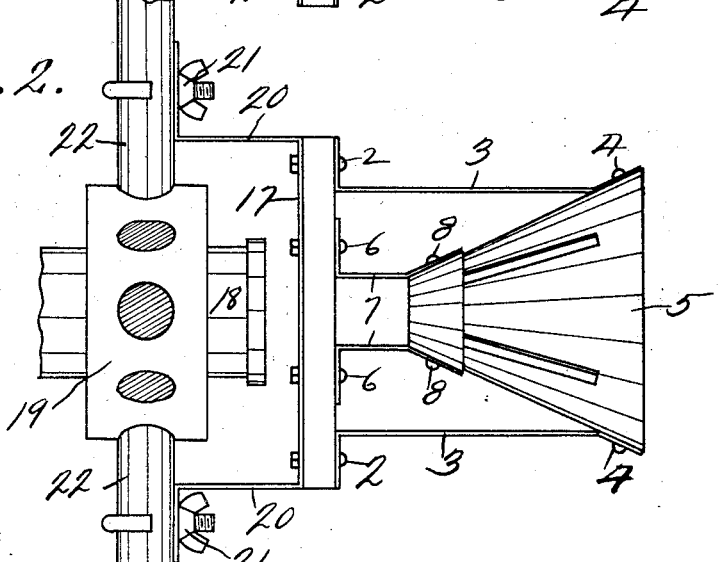
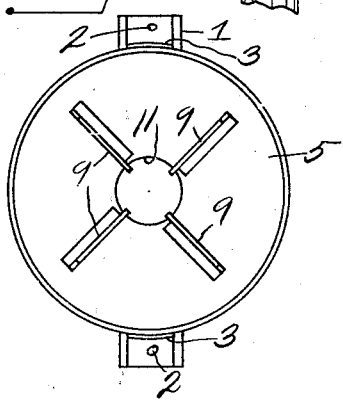
INVENTOR.
W. Wiegand
BY
James W. Martin
ATTORNEY.

Patented Feb. 14, 1928.

1,658,958

UNITED STATES PATENT OFFICE.

WILLIAM WIEGAND, OF CEDAR BLUFFS, NEBRASKA.

SEED-CORN BUTT AND TIPPER.

Application filed May 25, 1926. Serial No. 111,525.

The invention relates to seed corn tippers, and has for its object to provide a device of this character into which the butt and tip ends of ears of seed corn may be inserted for removing the kernels therefrom, thereby only leaving on the ear kernels which are suitable for seed corn.

A further object is to provide a tipper for seed corn ears comprising a conically shaped member having inturned converging flanges against which the ends of the ear of corn are forced for removing the kernels from the ear. Also to provide a base member having outwardly extending arms connected to the conically shaped member for supporting and bracing the same and means carried by the base member whereby said base member may be attached to a rotatable member.

A further object is to provide or form the grain dislodging flanges by striking the same inwardly from the conically shaped member.

A further object is to dispose the conically shaped member horizontally so that dislodged grain will fall therefrom.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the device showing the same attached to a handle member.

Figure 2 is a modified form of device showing the same attached to the fly wheel of a corn sheller.

Figure 3 is a view looking into the conically shaped member.

Referring to the drawing, the numeral 1 designates the base bar, to which is secured at 2 outwardly extending arms 3, the outer ends of which arms are connected at 4 to a conically shaped member 5, and which arms 3 brace and support the outer end of the member 5. Connected to the base 1 at 6 are outwardly extending arms 7, which are connected at 8 to the inner end of the conically shaped member 5, thereby bracing said inner end and in combination with the braces 3 rigidly supporting and bracing the member 5 during the operation of the device.

Disposed within the conically shaped member 5 are converging inwardly struck flanges 9, against which the ends of the ear of corn 10 are placed for dislodging and removing the kernels at the ends of the ear and which removed kernels are generally small and not fit for seed corn purposes. The inner end of the conically shaped member 5 is open as shown at 11 for allowing passage of grain and the end of the ear during the kernel removing operation. It will be noted that the axis of the conically shaped member 5 is horizontally disposed and consequently dislodged kernels will immediately flow from the conically shaped member when the device is in operation.

Secured to the base 1 at 12 are converging arms 13 which terminate in members 14 engaging opposite sides of the handle member 15 and which members 14 are drawn together by the bolts 16, thereby securely clamping the device on the handle member 15. During the operation of the device shown in Figure 1, the operator grasps the handle member 15 for rotating the device while holding the ear of corn 10 with the other hand. However it is obvious that this would be a tiresome operation where a great deal of corn is involved and to obviate this difficulty the form shown in Figure 2, may be used and in this form the base 1 is provided with a U-shaped bracket 17, which arches the hub 18 of the balance wheel 19 of a conventional form of corn sheller. The arms 20 of the bracket 17 is secured by means of clamping bolts to the spokes 22 of the balance wheel, therefore it will be seen by operating the corn sheller, the device will be rotated and it will only be necessary for the operator to insert the ends of the ear of corn into the conically shaped member 5.

From the above it will be seen that a corn shelling device is provided into which the butts and tips of ears of seed corn may be inserted for removing the undesirable kernels from the ears which are not fit or desirable for seed corn purposes. It will also be seen that device is simple in construction, the parts reduced to a minimum and the device can be cheaply manufactured and sold.

The invention having been set forth what is claimed as new and useful is:—

A seed corn tipper comprising a base, means for attaching said base to an axially disposed rotatable member, a conically shaped ear receiving member having its small end inwardly disposed and in axial relation to the rotatable member and the base, outwardly extending brace arms carried by the base and connected to the small end of the conically shaped member, outwardly extending arms carried by the base and connected to the outer end of the conically shaped member and kernel dislodging flanges within the conically shaped member.

In testimony whereof I hereunto affix my signature.

WILLIAM WIEGAND.